United States Patent [19]
Bronner

[11] Patent Number: 6,026,288
[45] Date of Patent: Feb. 15, 2000

[54] COMMUNICATIONS SYSTEM WITH AN APPARATUS FOR CONTROLLING OVERALL POWER CONSUMPTION BASED ON RECEIVED SIGNAL STRENGTH

[75] Inventor: Peter E. Bronner, Mohnton, Pa.

[73] Assignee: Lucent Technologies, Inc., Murray Hill, N.J.

[21] Appl. No.: 08/762,507

[22] Filed: Dec. 10, 1996

[51] Int. Cl.[7] .................................................. H04B 1/26
[52] U.S. Cl. ...................... 455/343; 455/254; 455/311
[58] Field of Search .......................... 455/226.2, 226.3, 455/343, 254, 295, 296, 311, 334

[56] References Cited

U.S. PATENT DOCUMENTS

| | | | |
|---|---|---|---|
| 5,001,776 | 3/1991 | Clark | 455/226.2 |
| 5,390,357 | 2/1995 | Nobusawa et al. | 455/343 |
| 5,392,457 | 2/1995 | Davis et al. | 455/343 |
| 5,406,613 | 4/1995 | Peponides et al. | 455/343 |
| 5,564,094 | 10/1996 | Anderson et al. | 455/311 |
| 5,722,062 | 2/1998 | Nakanishi et al. | 455/311 |
| 5,886,547 | 3/1999 | Deurec et al. | 455/333 |

OTHER PUBLICATIONS

"Radiotron Designer's Handbook"Edited by F. Langford-Smith; 1952; pp. 988–990 & 1111–1112 & 1268–1274.

*Primary Examiner*—Edward F. Urban

[57] ABSTRACT

For use in a system having a received signal path therein, the signal path including a mixer that modifies a carrier frequency of an information signal propagating through the signal path, an apparatus for, and method of, reducing an overall power consumption of the system and a radio device employing the same. The apparatus includes: (1) a received signal strength indicator ("RSSI") circuit, in communication with the signal path, that provides an RSSI signal that is a function of a power of the information signal and (2) a power reduction circuit, coupled to the RSSI circuit, that reduces a current draw of the mixer when the RSSI signal exceeds an upper threshold level, the overall power consumption of the receiver thereby reduced.

17 Claims, 3 Drawing Sheets

COMMUNICATIONS SYSTEM WITH AN APPARATUS FOR CONTROLLING OVERALL POWER CONSUMPTION BASED ON RECEIVED SIGNAL STRENGTH

TECHNICAL FIELD OF THE INVENTION

The present invention is directed, in general, to wireless communications and, more specifically, to a system and method for reducing the overall power consumption of a receiver based on received signal strength.

BACKGROUND OF THE INVENTION

Two of the most popular consumer electronic devices are the cordless telephone and the cellular telephone. Cordless telephones consisting of a handset and a base that communicate via a radio link are used pervasively in the home and office. The cordless phone's popularity stems chiefly from the user's ability to roam freely while talking on the cordless phone. Cellular phones extend this freedom beyond the home and office by allowing a cellular phone user to communicate with a base station in a predefined cellular area. As the user roams from cell to cell, the cellular network automatically transfers the user from base station to base station.

As in the case of battery-powered laptop computers, it is a key design objective to minimize the power consumption of cordless and cellular telephones, thereby extending the time between recharges of the handset batteries. Most users of portable radio telephones (whether cellular or cordless) carry the phones in "standby" mode the majority of the time. In standby mode, the RF receiver is "ON", but the transmitter is "OFF". This saves power and extends battery life. However, even in "active" mode, where the user is engaged in a phone call, it is possible to save power under certain operating conditions.

One of the operating parameter signals used in cellular telephones is a received signal strength indicator (RSSI), which provides an accurate estimate of the signal strength received from a base station. RSSI is used for numerous purposes, including prompting the current base station to transfer monitoring of the mobile cellular to a new base station when the current base station no longer provides a satisfactory signal. The base station may also use RSSI data received from its associated mobile cellular phones to increase or decrease its transmitting power. In the mobile cellular phone, RSSI may be used to adjust receiver gain in those phones which employ automatic gain control (AGC) amplifiers. In a like manner, cordless telephones may also derive a RSSI signal in the handset, which signal is then used to adjust the transmission power of either the handset or the base, or both.

When the received "wanted" signal is very strong, there is minimal risk of interference from other large signals, and the ever present background noise is much smaller than the wanted signal. Under these conditions, there is no need for the high gain and anti-interference performance associated with wanted signals that are relatively weak and noisy. It is therefore possible to reduce bias current in some of the receiver components, thereby conserving power.

For example, switchable gain low-noise amplifiers (LNA) have been implemented in RF receiver front-ends to minimize total power supply current when the RF receiver is operating in half duplex mode. If the RF receiver switches to full duplex (i.e., the transmitter operates simultaneously with the receiver), the LNA current is switched to full power to increase the compression point and avoid interference from the high-power transmit signal coexisting on the antenna at the same time as the minimum strength received signal.

However, the front ends of conventional RF receivers also contain RF mixers that operate using substantially constant bias current, independent of the strength of the received wanted signal. The power supply current in an RF mixer may typically be 6–10 mA (or more). Yet when the received signal is strong, such as when a mobile cellular phone is near the base station or a cordless handset is near the base, only 1–2 mA of current may be required for proper operation of the RF mixer. Thus, under certain operating conditions, the amount of current in the RF mixer can be reduced, thereby reducing power consumption. The current may be reduced less is needed to establish a level of intermodulation distortion which protects a strong "wanted" signal from interfering signals.

Therefore, there is a need in the art for improved RF receivers employing RF mixers that consume less power under strong received signal conditions. There is a still further need for improved RF receivers that employ switchable gain RF mixers that may be switched between a high-power mode and a low-power mode depending on the value of a received signal strength indicator (RSSI).

SUMMARY OF THE INVENTION

To address the above-discussed deficiencies of the prior art, the present invention provides, for use in a receiver having a signal path therein, the signal path including a mixer that modifies a carrier frequency of an information signal propagating through the signal path, a system for, and method of, reducing an overall power consumption of the receiver and a mobile station employing the same. The system includes: (1) a received signal strength indicator ("RSSI") circuit, in communication with the signal path, that provides an RSSI signal that is a function of a power of the information signal and (2) a power reduction circuit, coupled to the RSSI circuit, that reduces a current draw of the mixer when the RSSI signal exceeds an upper threshold level, the overall power consumption of the receiver thereby reduced.

The present invention therefore introduces the concept of reducing the power consumption of at least one mixer in the signal path when the RSSI signal indicates that the information signal is strong. This reduces the overall power consumption of the receiver and increases the lifetime of a battery that is to power the receiver. The present invention is applicable to any mobile station, including cordless telephones, cellular telephones and other battery-powered receivers.

In one embodiment of the present invention, the power reduction circuit increases the current draw of the mixer when the RSSI signal falls below a lower threshold level, the upper and lower threshold levels forming a hysteresis band to render the power reduction circuit immune to changes in RSSI signal level caused by operation of the power reduction circuit. In an embodiment to be illustrated and described, the hysteresis band prevents the feedback loop that includes the power reduction circuit from oscillating when the RSSI signal is at or near the upper threshold limit.

In one embodiment of the present invention, the mixer modifies the carrier frequency to produce a first intermediate frequency. In the embodiment to be illustrated and described, the signal path is staged, such that the incoming information signal is stepped down in stages through intermediate frequencies. Of course, the present invention is equally applicable in a receiver that employs only a single mixer.

In one embodiment of the present invention, the power reduction circuit modifies a current source which sets the bias currents in the mixer circuit to reduce the current draw of the mixer. Those skilled in the art are familiar with other ways of reducing the current draw of a mixer.

In one embodiment of the present invention, the power reduction circuit comprises a combinatorial circuit that compares the RSSI signal with a first reference signal representing the upper threshold level. In a related embodiment, the signal path further includes an amplifier having an output coupled to the mixer and the power reduction circuit comprises a combinatorial circuit that compares the RSSI with a second reference signal representing a lower threshold level to reduce a current draw of the amplifier. In an embodiment to be described, fixed references are employed. Alternatively, the references may be allowed to float or adapt based on other operating parameters of the receiver.

In one embodiment of the present invention, the signal path includes a bandpass filter, coupled to an output of the mixer, that attenuates a high frequency output of the mixer. Of course, those skilled in the art understand that a filter need not be present in the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

In the following discussion, the particular RF receiver architectures used to describe the prior art and the present invention are by way of example only and should not be used to limit the scope of the present invention to any particular RF receiver architecture. Those skilled in the art will readily understand that the circuits and methods described herein which embody the present invention may readily be applied across a wide variety of RF receivers.

For the purpose of simplicity in describing the operation of the present invention, it will be assumed that an improved RF receiver according to the present invention is implemented in a mobile cellular telephone. However, it should be understood that the disclosed improved RF receiver may be implemented in other types of radio devices, including cordless telephones.

Figure 1:
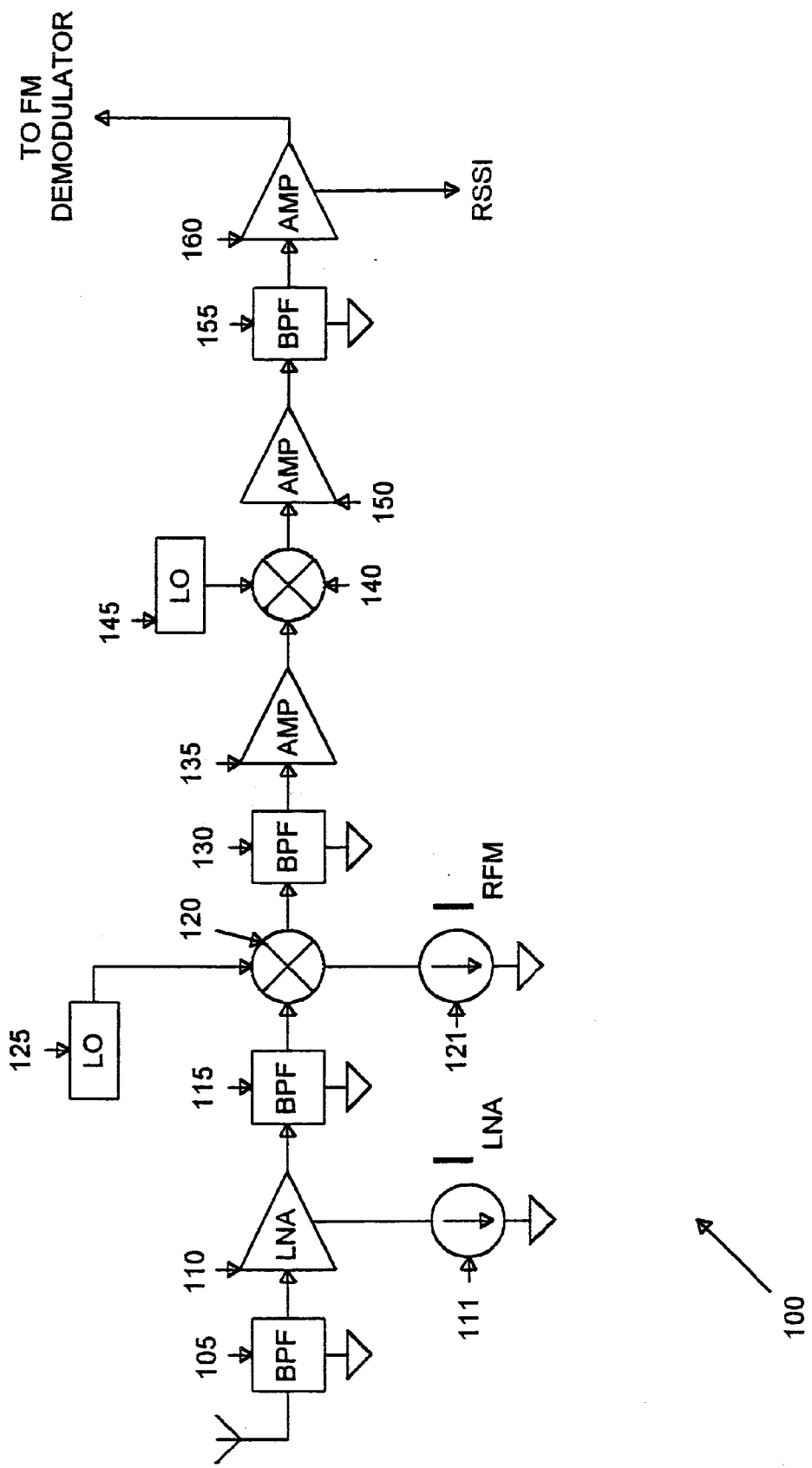
FIG. 1 illustrates an exemplary RF receiver according to the prior art.

Referring initially to FIG. 1, there is illustrated an exemplary RF receiver 100 according to the prior art. The RF spectrum is received by an antenna at the receiver front-end and is filtered in bandpass filter (BPF) 105, which passes the frequencies of interest to the remainder of RF receiver 100. For example, in conventional U.S. cellular communications, BPF 105 passes a "wanted" receive band from 869 MHZ to 894 MHZ. Next, low-noise amplifier (LNA) 110 amplifies the filtered pass band signals to an appropriate output level for further processing. In conventional receivers that perform full duplex communication, LNA 110 bias current, $I_{LNA}$, is set to a high enough level to allow it to avoid compression by leakage of transmitter output power applied to the shared antenna. For example, in conventional U.S. cellular communications, the transmit band is from 824 MHZ to 849 MHZ. The relatively high power at which the transmit band is transmitted causes some "leakage" of the transmitted noise into the receive band. This leakage constitutes interference in the receiver circuitry. Constant current source 111 in LNA 110 draws a high bias current, $I_{LNA}$, to maximize the amplification of the wanted signals relative to the leakage and other interference signals.

The amplified pass band is filtered again in BPF 115, which has a more symmetrical response than does BPF 105 and has sharper slopes in the "skirt" frequencies on the side of the passband away from the transmit band than does BPF 105. BPF 105 has sharper slopes in the skirt frequencies on the transmit side of the passband. The output of BPF 115 is one of the inputs of RF mixer 120. The other input to RF mixer 120 is the reference carrier generated by tunable local oscillator 125. LO 125 is tuned to a reference frequency (e.g., 955 MHZ) that is, for example, 80 MHZ higher than the center frequency of the "wanted" 30 KHz bandwidth signal (in this example, 875 MHZ) in the filtered pass band. RF mixer 120 generates output signals having frequencies that are the sum of the input frequencies and the difference of the input frequencies. Thus, the difference frequency signal produced by RF mixer 120 contains, among other things, a down-conversion of the "wanted" 30 KHz bandwidth signal from its initial frequency (viz., 875 MHZ) in the RF pass band to a first intermediate frequency (IF), namely, 80 MHZ. The remainder of the pass band is also down-converted by RF mixer 120. Constant current source 121 draws a relatively high constant current, $I_{RFM}$, in RF mixer 120 while minimizing the generation of spurious intermodulation distortion frequency products due to large, coexisting unwanted signals. This current is independent of the strength of the received RF signal.

Next, the down-converted first IF signal is filtered in first IF filter, BPF 130. BPF 130 has a very narrow pass band centered around 80 MHZ, where the "wanted" 30 KHz bandwidth signal is now located. Thus, the up-converted signals and most of the down-converted signals produced by RF mixer 120 are eliminated at the output of BPF 130. Amplifier 135 amplifies the filtered "wanted" signal to compensate for any attenuation in BPF 130 and to strengthen the "wanted" signal relative to any existing noise.

The "wanted" 30 KHz bandwidth signal (located at 80 MHZ) is down-converted again in IF mixer 140 to a second IF frequency, for example 1 MHZ. Local oscillator (LO) 145 provides a reference frequency at, for example, 81 MHZ. As before, the output of IF mixer 140 contains frequencies that are the sum of the input frequencies and the difference of the input frequencies. Amplifier 150 amplifies the output of IF mixer 140 to compensate for attenuation in IF mixer 140.

The second IF signal is then filtered in a second IF filter, BPF 155, which has a narrow 30 KHz. Thus, the band near 1 MHZ. Thus, the output of BPF 155 is the "wanted" 30 KHz bandwidth signal (located at 1 MHZ).

The pass band output of BPF 155 is amplified in amplifier (AMP) 160 before being sent to a demodulator, which finally extracts the voice signal originally received by the cellular phone. One of the stages of AMP 160 rectifies a portion of the amplified second IF signal. The rectified signal, which is proportional to the RMS value of the output of BPF 155, is converted to a DC level to produce the received signal strength indicator (RSSI) signal. The RSSI signal may then be sent to an analog-to-digital converter (ADC) for further processing by a microcontroller in the cellular phone.

Figure 2:
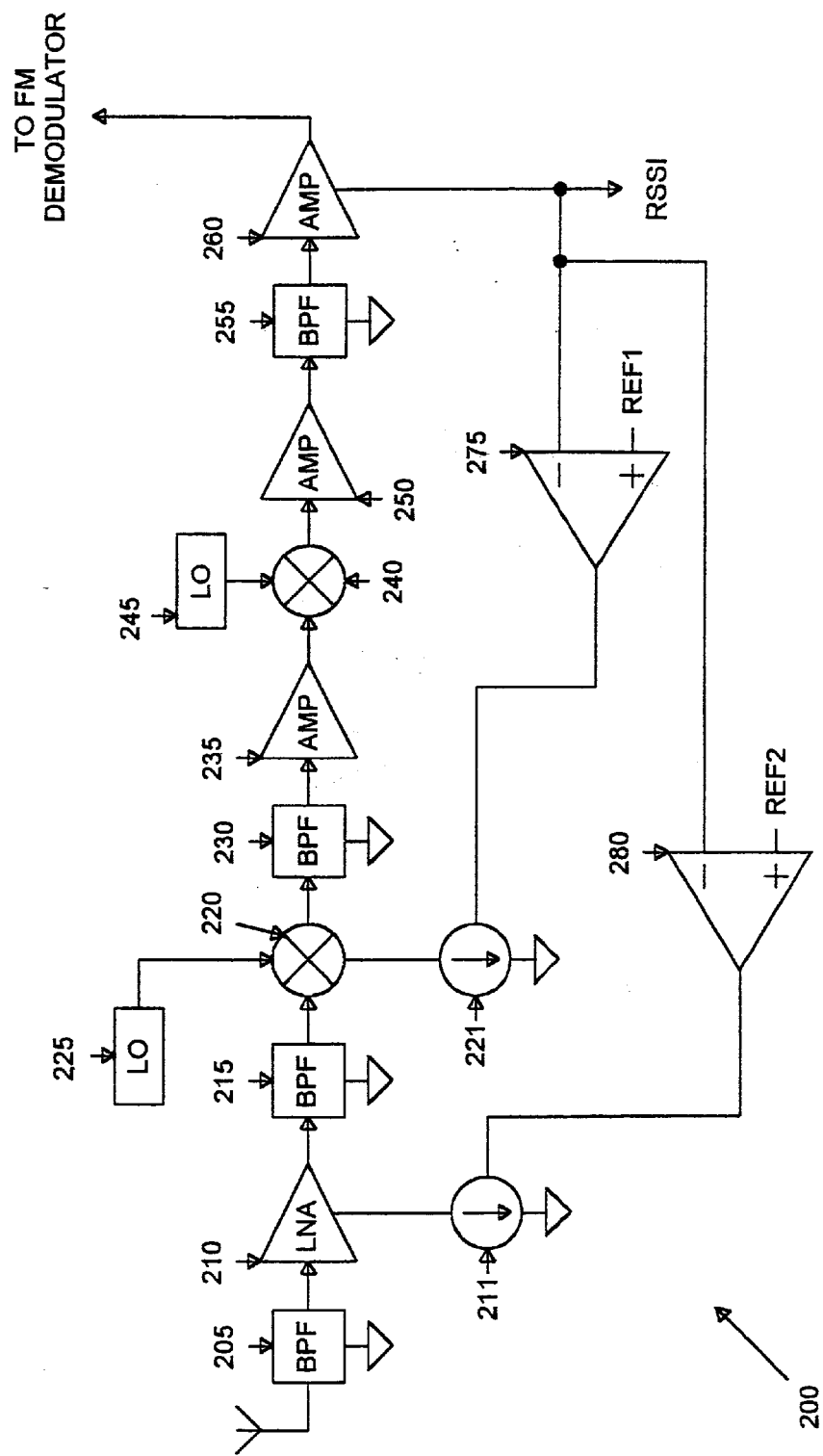
FIG. 2 illustrates an exemplary RF receiver according to one embodiment of the present invention.

FIG. 2 illustrates exemplary RF receiver 200 according to one embodiment of the present invention. Much of the circuitry in RF receiver 200 is identical to circuitry already described in connection with prior art RF receiver 100. Bandpass filter (BPF) 205 passes the frequencies of interest (869–894 MHZ) to the remainder of RF receiver 200. Low-noise amplifier (LNA) 210 amplifies the filtered pass band signals to an appropriate output level for further processing. In a preferred embodiment of the present invention, LNA 110 bias current, $I_{LNA}$, is controlled by a switchable current source 211. Switchable current source 211 may be switched between a "high power" mode and a "low power" mode by hysteresis comparator 280, according to the value of the RSSI signal.

The amplified pass band is filtered by BPF 215 and applied to RF mixer 220. The other input to RF mixer 220 is the reference frequency from LO 225. As before, RF mixer 220 generates output signals having frequencies that are the sum of the input frequencies and the difference of the input frequencies. Thus, the difference signal produced by RF mixer 220 contains the "wanted" 30 KHz bandwidth signal down-converted to an 80 MHZ first intermediate frequency (IF). As will be explained below in greater detail, RF mixer 220 contains a switchable current source 221 that may be switched between an "high power" mode and a "low power" mode by hysteresis comparator 275, according to the value of the RSSI signal.

The 80 MHZ first IF signal is filtered in first IF filter, BPF 230, which has a very narrow pass band centered around 80 MHZ, where the "wanted" 30 KHz bandwidth signal is located. AMP 235 amplifies the filtered "wanted" signal to compensate for any attenuation in BPF 230 and to strengthen the "wanted" signal relative to any existing noise.

The "wanted" 30 KHz bandwidth signal is down-converted in IF mixer 240, to a 1 MHZ second IF frequency, using the reference frequency provided by LO 245. AMP 250 amplifies the output of IF mixer 240 to compensate for attenuation in IF mixer 240. The 1 MHZ second IF signal is then filtered in a second IF filter, BPF 255, which has a narrow 30 KHz pass band near 1 MHZ.

Finally, the pass band output of BPF 255 is amplified in AMP 260 before being sent to a demodulator, which finally extracts the voice signal originally received by the cellular phone. AMP 260 also produces the received signal strength indicator (RSSI) signal, as in the case of the prior art RF receiver. The RSSI signal may then be sent to an analog-to-digital converter (ADC) for further processing by a microcontroller in the cellular phone. As noted above, the present invention uses the RSSI signal to switch switchable current source 211 of LNA 205 between "high power" mode and "low power" mode. For example, when the cellular phone is near its associated base station, the RSSI signal is strong and LNA 210 may be switched to low-power mode (i.e., lower current, $I_{LNA}$).

In a preferred embodiment of the present invention, the RSSI signal is also used to switch RF mixer 220 between a "high power" mode and a "low power" mode using hysteresis comparator 275. Hysteresis comparator 275 controls the current, $I_{RFM}$, drawn by current source 221. The present invention switches from a high current draw to a low current draw in RF mixer 220 when the RSSI signal is large enough to guarantee reliable reception in the low power mode. Furthermore, the present invention avoids unstable switching modes as the antenna signal varies near the switching threshold by incorporating hysteresis in the control loop. Implementation of the hysteresis may include, but is not limited to, a gradual transition region where the current in the current source changes non-abruptly.

Possible instability in switching modes may be demonstrated by the following example. If the RSSI signal has a range from 0 to 10 volts and the switching point, REF1, of RF mixer 220, is arbitrarily set at 5 volts, then current source 221 is switched to draw a low bias current through RF mixer 220 when the RSSI level rises above 5.0 volts. In the case where increasing received signal power causes the RSSI signal to rise from 4.9 volts to 5.1 volts, the resulting switch to low bias current would immediately reduce the gain of RF mixer 220. This, in turn, causes a corresponding drop in the value of the RSSI signal (to 2 volts, for example). Since the new 2-volt level of the RSSI signal is below the 5-volt REF1 level, current source 221 would be switched back to high power mode. This would cause the RSSI signal to jump back to 5.1 volts and the whole cycle repeats. This same phenomenon occurs if RF receiver 200 is operating in low power mode and a decreasing received signal power causes the RSSI signal to drop below 5.0 volts.

Hysteresis comparator 275 triggers on a MAX switching point and a MIN switching point that establish buffer regions above and below REF1 to prevent the above-described uncontrollable switching between "high power" and "low power" modes.

Because the RSSI signal is used separately by the system microcontroller for purposes of periodically reporting signal strength to a controlling base station via the cellular phone transmitter, the present invention may require the use of an interpretive algorithm for the RSSI signal to compensate for the fact that when the LNA and/or RF mixer bias currents are changed, the gain of the respective units also changes. To properly adjust for the hysteresis in the current source switching points (voltages), the system microcontroller track the RSSI signal history. The gain tolerances of all components in the RSSI signal path affect the RSSI signal, so it is necessary to perform a onetime calibration during the manufacturing process to establish the switching points as the antenna signal is increased from minimum to maximum and then decreased from maximum to minimum. The switching points may then be stored in EEPROM as part of an RSSI look-up table used by the system microcontroller to estimate antenna signal strength.

Figure 3:
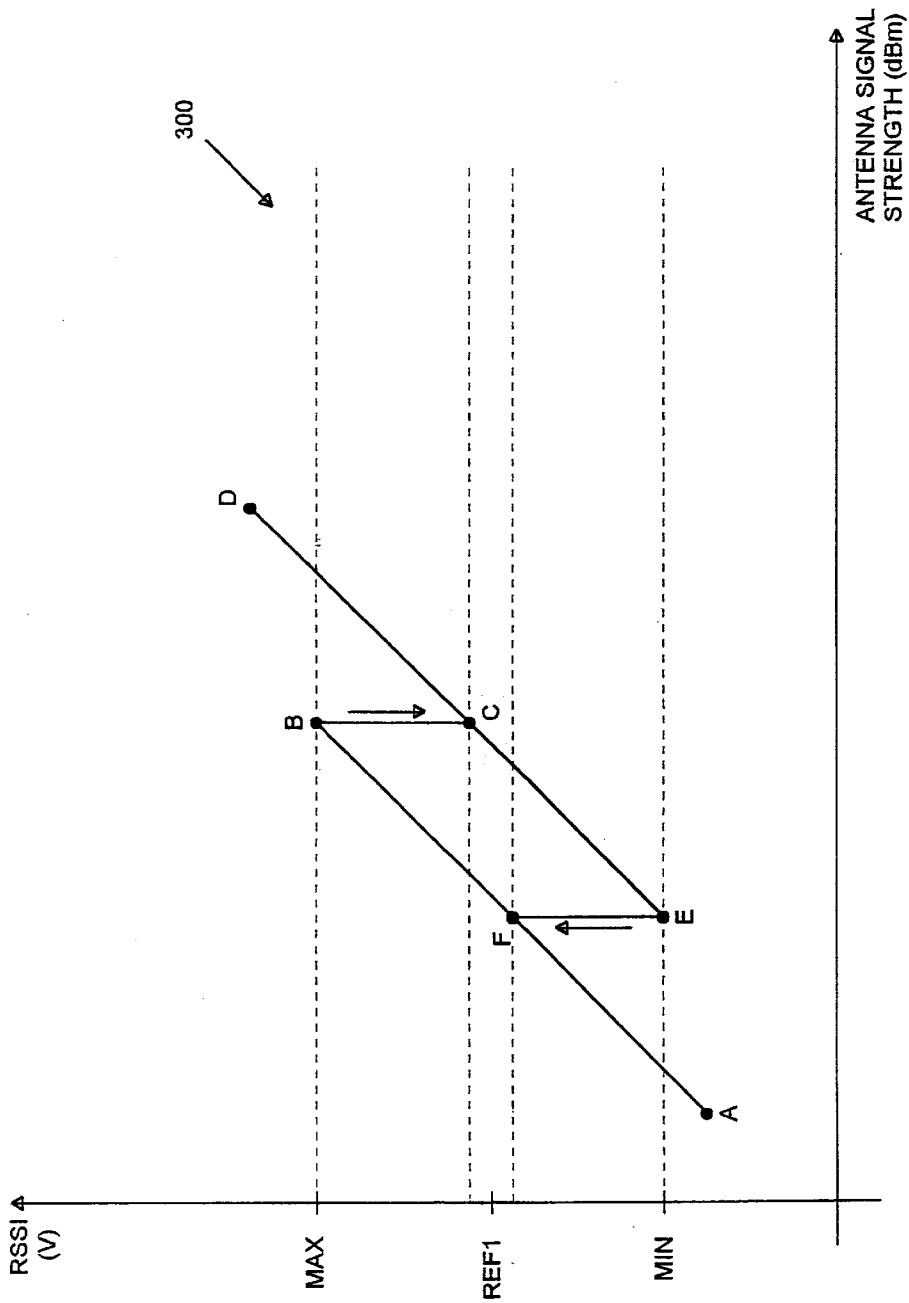
FIG. 3 illustrates an exemplary graph of RSSI voltage vs. Antenna signal strength, which shows the concept of hysteresis in RF mixer current switching points.

FIG. 3 illustrates exemplary graph 300 of RSSI voltage vs. antenna signal strength, which shows the concept of hysteresis in RF mixer current switching points. In the instance where RF receiver 200 is located at a geographic position remote from its associated base station (the "far" position), the relatively weak antenna signal strength and the relatively low value of RSSI are indicated by point A. In the instance where RF receiver 200 is located at a geographic position very close to its associated base station (the "near"

position), the relatively strong antenna signal strength and the relatively high value of RSSI are indicated by point D.

If the user of the cellular phone containing RF receiver 200 moves away from the far position towards the near position, the antenna signal strength and the RSSI level move from point A to point B along the straight line connecting points A and B (line AB). In so doing, the RSSI level will cross the threshold level REF1 used as a reference by hysteresis comparator 275. However, hysteresis comparator 275 does not immediately switch from "high power" mode to "low power" mode when the RSSI level rises above the REF1 level. Instead, hysteresis comparator 275 delays switching to "low power" mode until the RSSI level rises to point B, which corresponds to an upper trigger level, labeled "MAX" in FIG. 3.

When RF receiver 200 does finally switch to "low power" mode, the RSSI level instantly drops to point C as a result of the reduced gain in RF mixer 220. However, it is noted that point C is also above the REF1 level. The MAX trigger level is chosen sufficiently above the REF1 level so that even in "low power" mode the overall gain through the receiver stages results in an RSSI signal at point C that is above the REF1 level. As indicated by the dotted line through point C, the RSSI level at point C has a built-in gap, or noise margin, separating it from the REF1 level to allow for drift in component tolerances and operating conditions over time. The buffer region between point B and point C prevents the above-mentioned uncontrollable switching between "high power" and "low power" modes. As the user continues to move from the far point to the near point, the antenna signal strength and the RSSI level move from point C to point D along the straight line connecting points C and D (line CD).

The present invention employs a similar buffer region below the REF1 level. If the user of the cellular phone containing RF receiver 200 moves away from the near position towards the far position, the antenna signal strength and the RSSI level move from point D to point C along line CD. In so doing, the RSSI level will cross the threshold level REF1 used as a reference by hysteresis comparator 275. However, hysteresis comparator 275 does not immediately switch from "low power" mode to "high power" mode when the RSSI level falls below the REF1 level. Instead, hysteresis comparator 275 delays switching to "high power" mode until the RSSI level drops to point E, which corresponds to a lower trigger level, labeled "MIN" in FIG. 3.

When RF receiver 200 does finally switch to "high power" mode, the RSSI level instantly rises to point F as a result of the increased gain in RF mixer 220. However, it is noted that point F is also below the REF1 level. The MIN trigger level is chosen sufficiently below the REF1 level so that even in "high power" mode the overall gain through the receiver stages results in an RSSI signal at point F that is below the REF1 level. As indicated by the dotted line through point F, the RSSI level at point F has a built-in gap, or noise margin, separating it from the REF1 level to allow for drift in component tolerances and operating conditions over time. The buffer region between point E and point F prevents 5 the above-mentioned uncontrollable switching between "high power" and "low power" modes. As the user continues to move from the near point to the far point, the antenna signal strength and the RSSI level move from point F to point A along the straight line connecting points A and F (line AF).

Although the present invention has been described in detail, those skilled in the art should understand that they can make various changes, substitutions and alterations herein without departing from the spirit and scope of the invention in its broadest form.

What is claimed is:

1. A system having a received signal path therein, said signal path including a mixer that modifies a carrier frequency of an information signal propagating through said signal path, said system comprising an apparatus for reducing an overall power consumption of said system, said apparatus comprising:

a received signal strength indicator (RSSI) circuit, in communication with said signal path, that provides an RSSI signal that is a function of a power of said information signal; and a power reduction circuit, coupled to said RSSI circuit, that reduces a current draw of said mixer when said RSSI signal exceeds an upper threshold level and increases said current draw of said mixer when said RSSI signal falls below a lower threshold level, said upper and lower threshold levels forming a hysteresis band to render said power reduction circuit immune to changes in RSSI signal level caused by operation of said power reduction circuit.

2. The system as recited in claim 1 wherein said mixer modifies said carrier frequency to produce a first intermediate frequency.

3. The system as recited in claim 1 wherein said power reduction circuit modifies a current source which sets a bias current in said mixer.

4. The system as recited in claim 1 wherein said power reduction circuit comprises a combinatorial circuit that compares said RSSI signal with a first reference signal representing said upper threshold level.

5. The system as recited in claim 1 wherein said signal path further includes an amplifier having an output coupled to said mixer and said power reduction circuit comprises a combinatorial circuit that compares said RSSI with a second reference signal representing a lower threshold level to reduce a current draw of said amplifier.

6. The system as recited in claim 1 wherein said signal path includes a bandpass filter, coupled to an output of said mixer, that attenuates a high frequency output of said mixer.

7. For use in a system having a received signal path therein, said signal path including a mixer that modifies a carrier frequency of an information signal propagating through said signal path, a method of reducing an overall power consumption of said system, comprising the steps of:

providing an RSSI signal that is a function of a power of said information signal;

reducing a current draw of said mixer when said RSSI signal exceeds an upper threshold level; and increasing said current draw of said mixer when said RSSI signal falls below a lower threshold level, said upper and lower threshold levels forming a hysteresis band to render said power reduction circuit immune to changes in RSSI signal level caused by operation of said power reduction circuit.

8. The method as recited in claim 7 wherein said mixer modifies said carrier frequency to produce a first intermediate frequency.

9. The method as recited in claim 7 wherein said step of reducing comprises the step of modifying a current source which sets a bias current in said mixer.

10. The method as recited in claim 7 wherein said step of reducing comprises the step of comparing said RSSI signal with a first reference signal representing said upper threshold level.

11. The method as recited in claim 7 wherein said signal path further includes an amplifier having an output coupled to said mixer, said method further comprising the step of comparing said RSSI with a second reference signal representing a lower threshold level to reduce a current draw of said amplifier.

12. The method as recited in claim 7 wherein said signal path includes a bandpass filter, said method further comprising the step of attenuating a high frequency output of said mixer.

13. A radio device, comprising:
   a signal path, including:
      an antenna for receiving an information signal,
      a first low noise amplifier that amplifies said information signal,
      a first mixer that reduces a carrier frequency of said information signal to a first intermediate frequency,
      a second amplifier that further amplifies said information signal,
      a second mixer that reduces said first intermediate frequency to a second intermediate frequency,
      a third amplifier that still further amplifies said information signal, and
      a frequency modulation (FM) demodulator that reduces said second intermediate frequency to a final frequency;
   a received signal strength indicator (RSSI) circuit, in communication with said signal path, that provides an RSSI signal that is a function of a power of said information signal; and
   a power reduction circuit, coupled to said RSSI circuit, that reduces a current draw of said first mixer when said RSSI signal exceeds an upper threshold level and increases said current draw of said mixer when said RSSI signal falls below a lower threshold level, said upper and lower threshold levels forming a hysteresis band to render said power reduction circuit immune to changes in RSSI signal level caused by operation of said power reduction circuit.

14. The radio device as recited in claim 13 wherein said power reduction circuit modifies a current source which sets a bias current in said first mixer to reduce said current draw of said first mixer.

15. The radio device as recited in claim 13 wherein said power reduction circuit comprises a combinatorial circuit that compares said RSSI signal with a first reference signal representing said upper threshold level.

16. The radio device as recited in claim 13 wherein said power reduction circuit comprises a combinatorial circuit that compares said RSSI with a second reference signal representing a lower threshold level to reduce a current draw of said first amplifier.

17. The radio device as recited in claim 13 wherein said signal path includes a bandpass filter, coupled to an output of said first mixer, that attenuates a high frequency output of said first mixer.

* * * * *